United States Patent
Melnyk et al.

(10) Patent No.: US 8,775,665 B2
(45) Date of Patent: Jul. 8, 2014

(54) METHOD FOR CONTROLLING DOWNLOAD RATE OF REAL-TIME STREAMING AS NEEDED BY MEDIA PLAYER

(75) Inventors: Miguel Melnyk, Champaign, IL (US); Robert Kidd, Urbana, IL (US); Andrew Penner, Champaign, IL (US); Jeremy Tidemann, Champaign, IL (US); Fabian Breg, Savoy, IL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 351 days.

(21) Appl. No.: 12/368,260

(22) Filed: Feb. 9, 2009

(65) Prior Publication Data

US 2010/0205318 A1 Aug. 12, 2010

(51) Int. Cl.
*G06F 15/16* (2006.01)
*H04L 29/06* (2006.01)

(52) U.S. Cl.
CPC ............ *H04L 65/602* (2013.01); *H01L 65/605* (2013.01); *H04L 65/80* (2013.01)
USPC ............................. 709/233; 709/231; 709/236

(58) Field of Classification Search
CPC ...... H04L 65/602; H04L 65/605; H04L 65/80
USPC .......................................... 709/230–233, 236
See application file for complete search history.

(56) References Cited

U.S. PATENT DOCUMENTS

| | | | |
|---|---|---|---|
| 5,822,537 A * | 10/1998 | Katseff et al. ................. | 709/231 |
| 7,111,058 B1 * | 9/2006 | Nguyen et al. ................. | 709/224 |
| 7,450,130 B2 * | 11/2008 | Swedberg et al. ............ | 345/545 |
| 7,529,276 B1 * | 5/2009 | Ramakrishnan .............. | 370/516 |
| 7,627,684 B2 | 12/2009 | Boucher et al. | |
| 7,653,539 B2 | 1/2010 | Yamanashi et al. | |
| 7,720,983 B2 | 5/2010 | Klemets et al. | |
| 7,747,764 B2 | 6/2010 | Batke et al. | |
| 7,764,668 B2 | 7/2010 | Yoshizawa et al. | |
| 7,779,443 B2 | 8/2010 | Kim | |
| 7,925,770 B1 * | 4/2011 | Hamel et al. .................. | 709/231 |
| 7,984,179 B1 * | 7/2011 | Huang .......................... | 709/233 |

(Continued)

FOREIGN PATENT DOCUMENTS

| | | | |
|---|---|---|---|
| CN | 1409547 A | 4/2003 | |
| EP | 1 202 487 A2 | 5/2002 | |

(Continued)

OTHER PUBLICATIONS

Notification of Transmittal of the International Search Report and the Written Opinion for International application No. PCT/US2010/000959, mailed Sep. 13, 2010, 11 pgs.

(Continued)

*Primary Examiner* — Hieu Hoang
(74) *Attorney, Agent, or Firm* — Finnegan, Henderson, Farabow, Garrett & Dunner, LLP

(57) ABSTRACT

A computer-implemented method including receiving streaming media, wherein the streaming media is requested by a media player at a mobile device; retrieving timing information from the streaming media, wherein the timing information corresponds to real-time playback rate on the media player; framing the streaming media based on the real-time playback rate on the media player; scheduling transmission of the framed streaming media based on the framing; and transmitting the framed streaming media to the media player according to the schedule.

40 Claims, 11 Drawing Sheets

(56) References Cited

U.S. PATENT DOCUMENTS

| | | |
|---|---|---|
| 2002/0010938 A1 | 1/2002 | Zhang et al. |
| 2002/0103554 A1 | 8/2002 | Coles et al. |
| 2002/0154694 A1 | 10/2002 | Birch |
| 2003/0021296 A1* | 1/2003 | Wee et al. ............. 370/474 |
| 2003/0023738 A1 | 1/2003 | Boivie et al. |
| 2003/0105834 A1* | 6/2003 | Hoang .................... 709/219 |
| 2004/0064576 A1* | 4/2004 | Goldhor et al. ........ 709/232 |
| 2004/0107284 A1 | 6/2004 | Koperda et al. |
| 2004/0116143 A1* | 6/2004 | Love et al. .............. 455/522 |
| 2004/0170179 A1 | 9/2004 | Johansson et al. |
| 2004/0267445 A1 | 12/2004 | De Luca et al. |
| 2005/0005020 A1 | 1/2005 | Rey et al. |
| 2005/0036698 A1 | 2/2005 | Beom |
| 2005/0105471 A1 | 5/2005 | Ido et al. |
| 2005/0175093 A1 | 8/2005 | Haskell et al. |
| 2005/0180502 A1 | 8/2005 | Puri |
| 2005/0210155 A1 | 9/2005 | Oeda et al. |
| 2005/0259947 A1* | 11/2005 | Wang et al. ............. 386/46 |
| 2005/0262251 A1 | 11/2005 | Klemets et al. |
| 2005/0283809 A1 | 12/2005 | Kim |
| 2006/0083260 A1 | 4/2006 | Wang et al. |
| 2006/0092867 A1 | 5/2006 | Muller et al. |
| 2006/0095943 A1* | 5/2006 | Demircin et al. ........ 725/81 |
| 2006/0156347 A1* | 7/2006 | Zhang et al. ............ 725/62 |
| 2006/0165166 A1 | 7/2006 | Chou et al. |
| 2006/0182027 A1 | 8/2006 | Conte et al. |
| 2006/0184688 A1 | 8/2006 | Ganguly et al. |
| 2006/0203831 A1 | 9/2006 | Yoshizawa et al. |
| 2006/0252449 A1* | 11/2006 | Ramesh .................... 455/522 |
| 2007/0091920 A1 | 4/2007 | Harris et al. |
| 2007/0192812 A1* | 8/2007 | Pickens et al. ........... 725/94 |
| 2007/0208557 A1 | 9/2007 | Li et al. |
| 2008/0056666 A1* | 3/2008 | Mio ........................... 386/65 |
| 2008/0120424 A1 | 5/2008 | Deshpande |
| 2008/0195743 A1* | 8/2008 | Brueck et al. ........... 709/231 |
| 2008/0198929 A1 | 8/2008 | Fujihara |
| 2009/0013366 A1 | 1/2009 | You et al. |
| 2009/0019178 A1 | 1/2009 | Melnyk et al. |
| 2009/0254657 A1 | 10/2009 | Melnyk et al. |
| 2009/0327698 A1 | 12/2009 | Baker et al. |
| 2010/0067383 A1* | 3/2010 | Nagy et al. .............. 370/236 |
| 2010/0074535 A1* | 3/2010 | Bennett .................... 382/209 |
| 2011/0013514 A1* | 1/2011 | Mahkonen ............... 370/235 |

FOREIGN PATENT DOCUMENTS

| | | |
|---|---|---|
| EP | 1 294 193 A1 | 3/2003 |
| WO | WO 2005/022845 | 3/2005 |
| WO | WO 2007/018841 A1 | 2/2007 |
| WO | WO 2007/018841 A3 | 2/2007 |

OTHER PUBLICATIONS

Baldo, Nicola, et al., "RTCP Feedback Based Transmission Rate Control for 3G Wireless Multimedia Streaming," IEEE, 0-7803-8523-3/04 (2004), pp. 1817-1821.

Basso, Andrea, et al., "Performance Evaluation of MPEG-4 Video over Realistic EDGE Wireless Networks," IEEE, 0-7803-7442-8/02 (2002), pp. 1118-1122.

Qu, Qi, et al., "Network-Aware Source-Adaptive Video Coding for Wireless Applications," 0-7803-8847-X/04 MILCOM (2004), Military Communications Conference, pp. 848-854.

Schulzrinne, H. et al., "RTP: A Transport Protocol for Real-Time Applications," Network Working Group, Jul. 2003, pp. 103.

International Search Report mailed Oct. 10, 2008 for PCT/US2008/008556.

International Search Report mailed Apr. 7, 2010 for PCT/US2010/000302.

Office Action mailed Mar. 18, 2010 in U.S. Appl. No. 12/170,347.

Office Action mailed on Sep. 1, 2010 in related U.S. Appl. No. 12/170,347, filed Jul. 9, 2008.

Office Action mailed Sep. 24, 2010 in related U.S. Appl. No. 12/416,085, filed Mar. 31, 2009.

Notice of Allowance and Examiner Interview Summary mailed on Mar. 25, 2011 in related U.S. Appl. No. 12/170,347, filed Jul. 9, 2008.

Notice of Alowance and Examiner Interview Summary mailed on Mar. 29, 2011 in related U.S. Appl. No. 12/416,085, filed Mar. 31, 2009.

Notification of Transmittal of the International Search Report and the Written Opinion for International Application No. PCT/US2010/000959, mailed Sep. 13, 2010, pp. 1-11.

International Preliminary Report on Patentability and Written Opinion for PCT Application No. PCT/US2010/000959 mailed Oct. 4, 2011.

Office Action mailed Oct. 25, 2011 in related U.S. Appl. No. 13/190,238, filed Jul. 25, 2011.

Office Action mailed Nov. 23, 2011 in related U.S. Appl. No. 13/194,761, filed Jul. 29, 2011.

Office Action dated Aug. 4, 2011 in related European Application No. 08780143.7 filed Jan. 28, 2010.

* cited by examiner

METHOD FOR CONTROLLING DOWNLOAD RATE OF REAL-TIME STREAMING AS NEEDED BY MEDIA PLAYER

BACKGROUND

Client devices with wireless connectivity can generate the vast majority of data traffic on wireless networks today—typically as much as 90% on a 3G network. Most of this traffic may be generated by web browsing. With the widespread availability of multimedia content on the web and the emergence of popular multimedia-sharing sites, multimedia downloads and streams are growing dramatically faster than web browsing. In some networks, multimedia may have already surpassed browsing as the dominant form of traffic, overwhelming operators' networks.

Progressive download (PD) has become a popular technique to provide transport for network multimedia sessions. This simple mechanism effectively supports on-demand multimedia sessions over high capacity networks. A remote media player simply requests the download of a media clip, which is transferred and played progressively as audio and video frames are received at the player's end. In the Internet environment, this download is typically done over HTTP, which in addition provides effective firewall traversal features.

Progressive download, or pseudo-streaming (PS), is very effective when conducted over high-capacity networks such as the wired internet. In such an environment, it is assumed that the network connection can always be fast enough to meet or exceed the required download rate for the clip to play smoothly and without interruption. In other words, the network download rate can always be higher than the bitrate of the media file being downloaded. In addition, it is assumed that uncontrolled downloading of large media files may not affect other users sharing the network infrastructure. On the Internet, the abundance and predictability of network capacity allows for the use of uncontrolled downloading, in which as much of the media content as possible is downloaded as fast as possible.

A problem arises when progressive downloads are conducted over limited-capacity, time-variable, shared network links (for example, a wireless cellular connection). On such networks, the effective bandwidth a user sees changes with location and with the number of users sharing the same cellular infrastructure. In this environment, uncontrolled downloads of large files may result in network congestion. Moreover, multimedia servers may try to transmit media data to client devices at the highest rate permitted by the network. This may introduce bursts in traffic patterns, clogging the network and disrupting other users and applications.

DESCRIPTION OF THE EMBODIMENTS

Figure 1A:
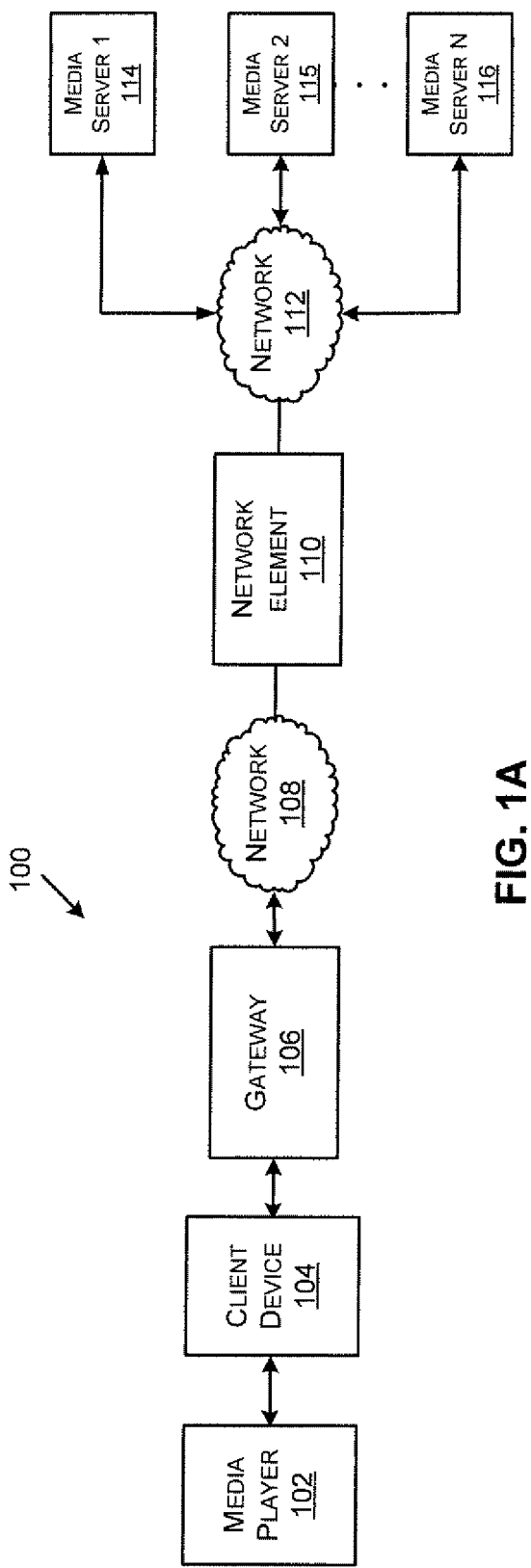
FIG. 1A illustrates a block diagram of an exemplary system.

Reference will now be made in detail to the exemplary embodiments of controlling download rate of real-time streaming according to playback rate on the media player, the examples of which are illustrated in the accompanying drawings. Wherever possible, the same reference numbers will be used throughout the drawings to refer to the same or like parts.

These embodiments describe a method and system for controlling download rate of real-time streaming according to playback rate on a media player at a mobile device. For example, Bytemobile's Multimedia Optimization application is an exemplary method and system that can intelligently optimize and reduce streaming media traffic on a wireless network. The method and system discussed here can add control to pseudo-streaming media transport, transforming an "as much as you can, as fast as possible" media file download model into a "download as you need, when you need it" download, based on playback rate on the media player. It can reduce data bursts by delivering the media byte stream just in time. In effect, it can spread or level the download of media data over time, reducing peaks of bandwidth consumption. A more even download of media data can allow network operators to accommodate the same number of users with less capacity in the network, making more efficient use of network resources. Thus, operators can benefit through reduced expenses for network expansion to support the growth of multimedia traffic.

The application of a media data download throttling method can be advantageous in a number of ways including but not limited to one or more of the following:

Network bandwidth savings. Many users of PS sessions do not view the clips in their entirety, resulting in wasted transferred bytes, which this method may avoid. The same number of bytes could be transferred to other users with tighter reception deadlines of time-sensitive media data instead.

Player buffer size awareness. The network or media server can become aware of the instantaneous player buffer size, and can decide to speed-up or slowdown the download to preserve the real-time of the session based on playback rate on the media player, avoiding playback interruptions. To achieve this, cross-layer flow control methods can be applied.

Bitrate Control. Advanced bitrate control mechanisms, such as Dynamic Bandwidth Shaping, can be combined with this method.

Description of the "PS Download Rate Control" Framework

FIG. 1 illustrates a block diagram of an exemplary system. The exemplary system can be any type of system that transmits streaming media over a network, such as a wireless network, Internet, etc. The exemplary system can include, among other things, a media player 102, a client device 104, a gateway 106, one or more networks 108 and 112, a network element (NE) 110, and one or more media servers 114-116.

Media player 102 can be a device or a client application installed on client device 104, used to play streaming media. For example, Adobe Flash Video Player, Microsoft Windows Media Player, RealPlayer, and any other player application can be such media player 102. Streaming media can be, for example, but not limited to, an audio stream file, a video stream file, or a media data file combining text, audio, still images, animation, video, and interactivity content, which is constantly received by or presented to an end-user while it is being delivered by a media provider.

Client device 104 is a hardware device such as a computer, a PDA, a cell phone, a laptop, a desktop, or any device accessing a data network. Client device 104 can include software applications that allow the device to communicate with and receive data packets, such as data packets of streaming media, from a data network. For example, client device 104 can send request data to a media server to download a particular streaming media file, and the media server can transmit the streaming media file to client device 104. In some embodiments, the streaming media file may be routed through network element 110.

Gateway 106 is one or more devices that serves as an entrance or a means of access and may or may not convert formatted data provided in one type of network to a particular format required for another type of network. Gateway 106, for example, may be a server, a router, a firewall server, a host, or a proxy server. Gateway 106 has the ability to transform the signals received from client device 104 into signals that network 108 can understand and vice versa. However, this transforming ability is not required in some data network, for example, Fourth-Generation (4G) or Worldwide Interoperability for Microwave Access (WiMAX). Gateway 106 may be capable of processing audio, video, and T.120 transmissions alone or in any combination, and is capable of full duplex media translations. Further, gateway 106 can include network element 110 for controlling download rate of streaming media, which is described below.

Networks 108 and 112 can include any combination of wide area networks (WANs), local area networks (LANs), or wireless networks suitable for packets type communications, such as Internet communications. Further, networks 108 and 112 can include can include network element 110 for controlling download rate of streaming media, which is described below.

Network element 110 can provide a framework for controlling download rate of the streaming media file according to playback rate on media player 102. It can be a software program and/or hardware device, can be part of one or more of media servers 114-116, can be part of any network device between client device 104 and media servers 114-116, and can be a stand-alone device between client device 104 and media servers 114-116. Network element 110 can act as a transparent media proxy or an optimization server to intercept streaming media, to reduce streaming media traffic volume by manipulating streaming media frames and applying transcoding and recoding techniques. This technique can allow network operators to introduce framework for controlling download rate of streaming media, with no need to roll out client software to client device 104, require the user of client device 104 to change his/her browsing habits, or rely on content providers to adjust their content. It can effectively increase a network's available bandwidth, providing capacity to service additional users and traffic.

When providing streaming media to media player 102, network element 110 can continuously monitor the byte stream to detect changes in available network bandwidth. It can automatically adjust the data reduction rate to match changing network conditions. This can effectively reduce traffic volumes during peak usage hours, or when the network is congested. During periods of network congestion, the user of media player 102 may experience media playback interruptions whenever the player is trying to download the remaining media stream. This can happen when the available bandwidth of the network drops below the rate at which the video was encoded. Network element 110 can dynamically reduce the media stream rate to the available network bandwidth, in turn reducing the interruptions experienced by the user. This can provide an optimal experience for live media streaming applications. The network element and the framework for controlling download rate are further described below.

Media servers 114-116 are computer servers that receives the media download request from media player 102 at client device 104, process the request accordingly, and transmit the media data to media player 102 through, in some embodiments, network element 110. For example, media servers 114-116 can be web servers, enterprise servers, or any other type of computer servers. Media servers 114-116 can be computers having a computer program responsible for accepting requests (e.g., HTTP, or other protocols that can initiate a media session) from client device 104 and for serving client device 104 with streaming media.

Figure 1B:
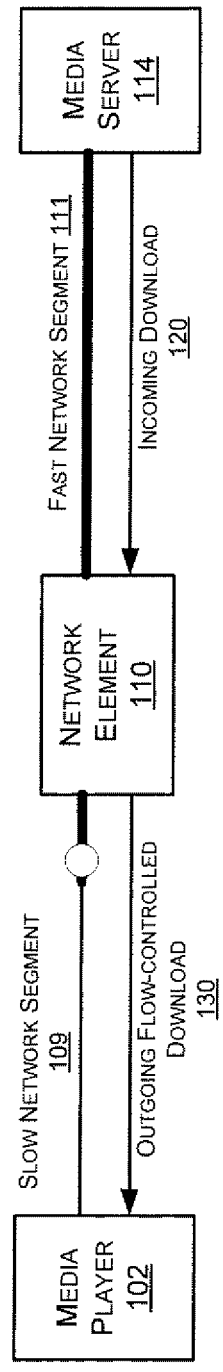
FIG. 1B illustrates a block diagram of simplified exemplary system of FIG. 1A.

FIG. 1B illustrates a block diagram of a simplified exemplary system of FIG. 1A. The simplified exemplary system can include, among other things, a media player 102, one or more network segments 109 and 111, a network element (NE) 110, and a media server 114.

A media session can be conducted over two network segments, generally of different capacity.

Fast segment (FS) 111. Generally, media server 114 is located on this network segment. No download control is required over this segment.

Slow segment (SS) 109: This is the network portion where the pseudo-streaming traffic is adapted and controlled as specified by the method and system described in this application.

Media server 114 is generally located in a fast network segment. All traffic pertaining to a multimedia session on the media player 102 traverses both fast and slow network segments at all times, and may traverse network element 110 that can alter the timing of the download. For example, incoming download 120 from media server 114 traverses fast network segment 111, and passes through network element 110. Network element 110 adapts and changes download rate based on real-time playback rate on media player 102. Then, network element 110 transmits outgoing flow-controlled download to media player 102, Controlling and altering the timing of the download is further described below.

This framework is suitable for embodiments on media server 114, or any network element in between media server 114 and the edge of slow network segment 1091 such as a proxy server, an optimization server, or a gateway.

Figure 2:
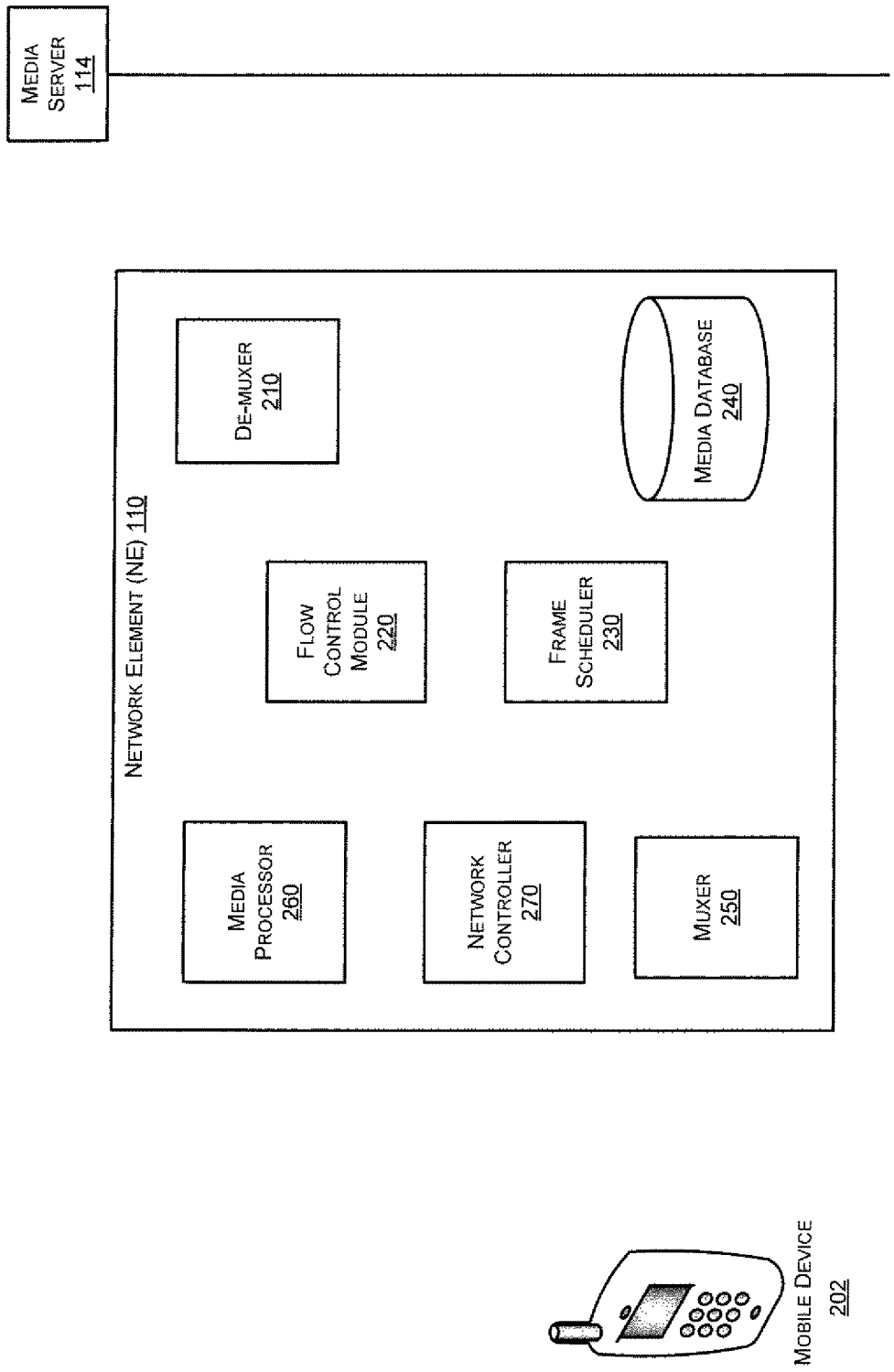
FIG. 2 is a block diagram illustrating an embodiment of the exemplary system of FIG. 1B.

FIG. 2 is a block diagram illustrating an embodiment of the exemplary system of FIG. 1. Mobile device 202 is a wireless device that can include, among other things, media player 102 and/or client device 104. While it is preferred that mobile device 202 can be a mobile phone, it will be appreciated by one of ordinary skill in the art that mobile device 202 can be any type of mobile device capable of requesting and receiving streaming media from a media server.

An exemplary embodiment of network element (NE) 110 can include the following components. It will be appreciated by one of ordinary skill in the art that two or more of the following components may be combined as one component.

De-muxer 210 can be a software program and/or a hardware device that intercepts and parses the incoming media download and retrieves information of the media, such as clip timing information as explained in the following section.

Flow control module 220 can be a software program and/or a hardware device that applies download rate patterns, and may frame the media data, and program the frame scheduler 230 accordingly.

Frame scheduler 230 can be a software program and/or a hardware device that triggers frame transmission according to timing specified by flow control module 220, media processor 260, and/or network controller 270.

Media database 240 can be a structured collection of records or data of framed streaming media. The structure can be organized as a structured file, a relational database, an object-oriented database or other appropriate database Computer software, such as a database management system, is utilized to manage and provide access to media database 240. Media database 240 can store and provide framed streaming media. It can be combined with other components of network element 110, such as frame scheduler 230, or Muxer 250. It can also be external to network element 110. Media database provides buffering to store media data that cannot be forwarded to media player yet, because of the application of this method Muxer 250 can be a software program and/or a hardware device that sends framed media data as instructed by flow control module 220, media processor 260, and/or network controller 270, according to the timing schedule.

Media processor 260 (optional) can be a software program and/or a hardware device that combines download rate control with media data optimization, such as media bitrate reduction techniques. For example, among other things, media processor 260 can change the content of individual media frames to lower media quality and save bytes to be sent over the network.

Network controller 270 (optional) can be a software program and/or a hardware device that detects updated information of the network where mobile device 202 is located and instruct media processor 250 to optimize the media data accordingly. For example, among other things, it can sense degradation of bandwidth in the slow network segment, and instruct media processor 250 to reduce media bitrate accordingly.

Figure 3:
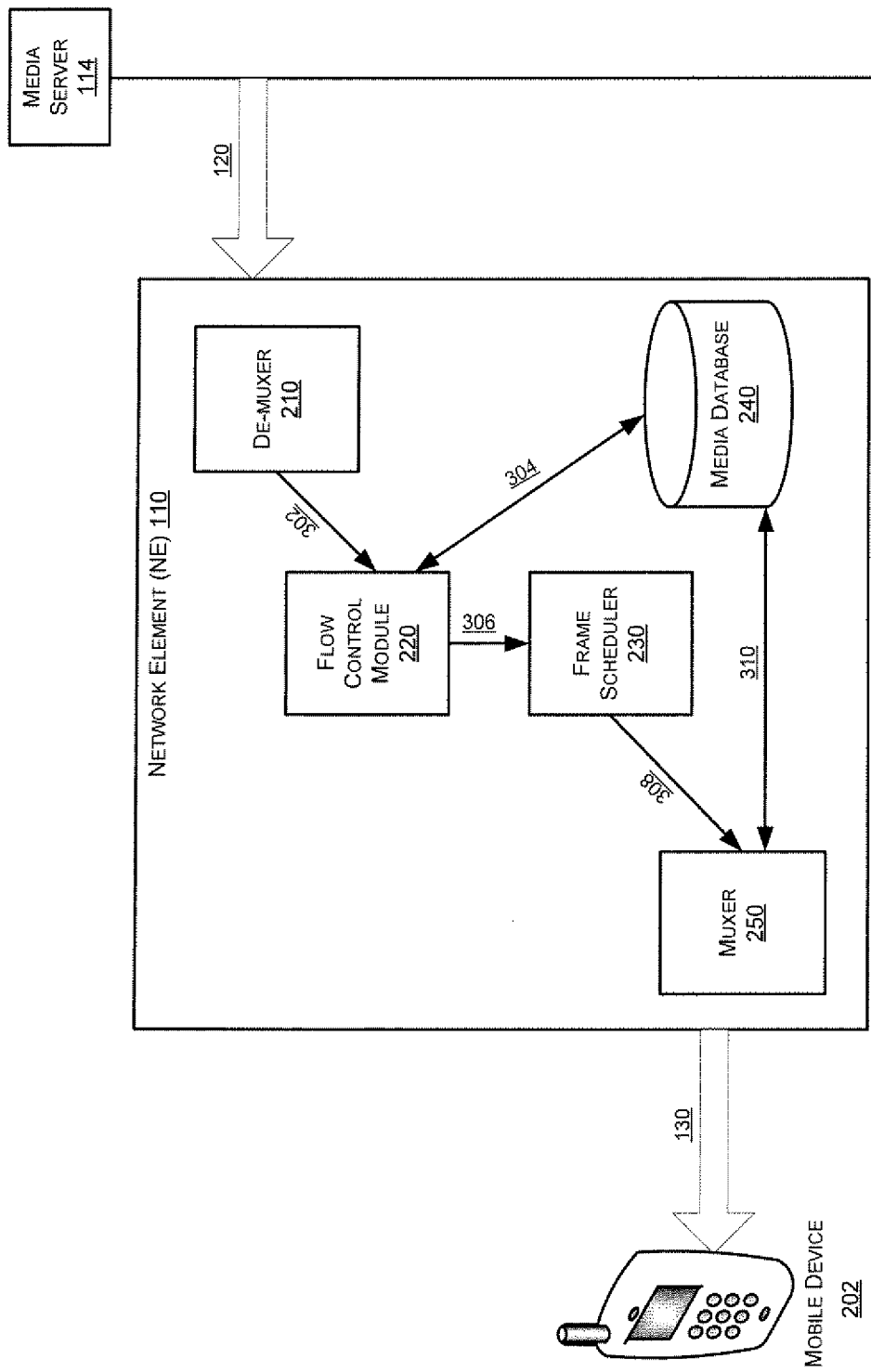
FIG. 3 is a functional diagram illustrating an exemplary communication flow for controlling download rate in the exemplary system of FIG. 2, based on timing information of streaming media.

FIG. 3 is a functional diagram illustrating an exemplary communication flow for controlling download rate in the exemplary system of FIG. 2, based on timing information of streaming media. After receiving (120) streaming media data from media server 114, de-muxer 210 parses the streaming media and obtains information of the streaming media, as further described below. For example, among other things, de-muxer 210 can retrieve timing information of the streaming media, which can be real-time playback rate on a media player at mobile device 202. De-muxer 210 then transfers (302) to flow control module 220 the parsed streaming media and the information used for controlling download rate.

Based on the information of the streaming media, including the timing information, flow control module 220 applies download rate patterns and frames parsed streaming media. The framed streaming media can correspond to the real-time playback rate on the media player at mobile device 202. Flow control module 220 then stores (304) the framed streaming media at media database 240 for transmission, and schedules (306) the frame scheduler 230 to trigger transmission of the frame steaming media according to the timing information. Scheduling transmission of streaming media is further described below.

Figure 4:
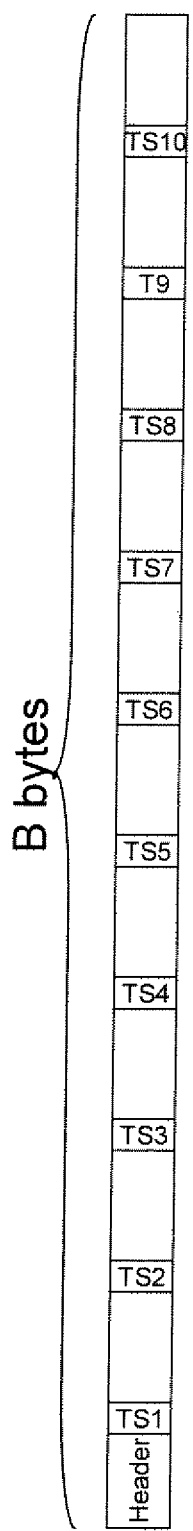
FIG. 4 illustrates an exemplary organization of a media clip of a total byte size B.

Frame scheduler 230 triggers (308) muxer 250 to transmit framed streaming media according to the timing schedule specified by flow control module 220. Upon the trigger (308), and after retrieving the stored media due to be sent (310), muxer 250 delivers (130) the framed streaming media to mobile device 202 according to the timing schedule. The delivery is flow-controlled download corresponding to the real-time playback rate on the media player at mobile device 202, Retrieval of Session Timing Information FIG. 4 illustrates an exemplary organization of a media clip of a total byte size B. A media file format can include a header, which may have information about characteristics of media tracks, for instance, audio codec, video codec, encoding parameters, etc. The media file format can also include one or more media frames, each of them carrying a Timestamp TS. TS includes the instant at which a frame should be rendered by the player for playback, and determines the real-time playback rate on the media player. It is appreciated by those skilled in the art that a data packet of media may not have one-to-one mapping relationship with a media frame.

As illustrated in FIG. 4, a media clip, for example, can include 10 media frames, each one labeled with consecutive timestamps TS1 . . . TS10. The media player may need to receive the header as soon as possible to allow proper decoding and playback of the clip. Each individual frame, however, may not be needed at the player before it is time to be played. The method explained here exploits this concept, spreading the transmission of media frames over time to ensure that frames are received by the player just in time to be rendered without disrupting the playback. Bandwidth savings are obtained since frames can be transmitted as needed. To achieve this, a network element can inspect and analyze the incoming media clip to recover timestamp information and other properties of the media clip, and control flow rate of download accordingly.

Figure 5:
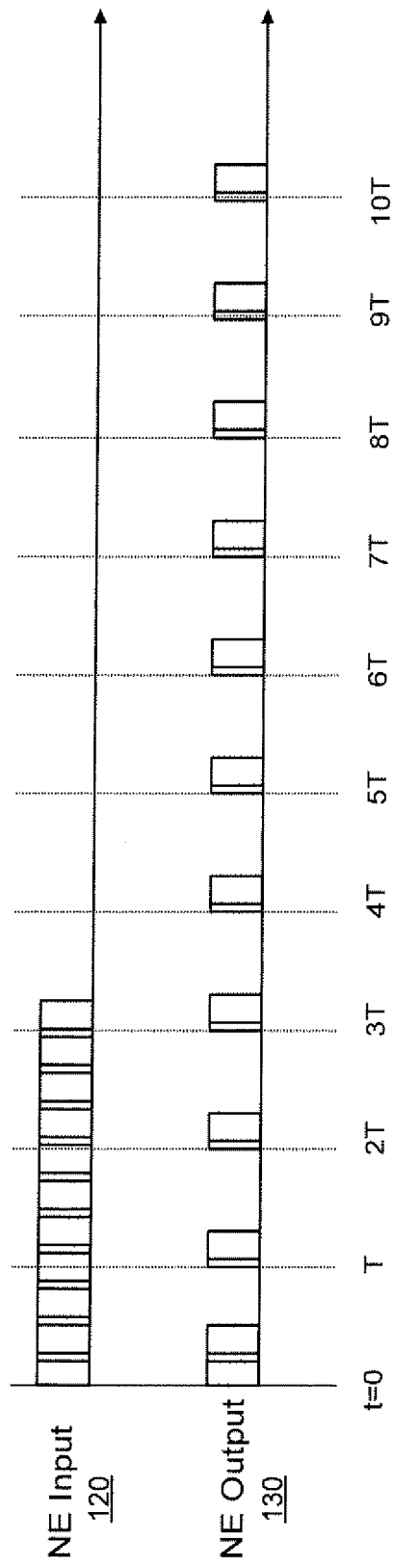
FIG. 5 illustrates an exemplary result of the application of controlling download rate to the media clip of FIG. 4, based on timing information of the media clip.

FIG. 5 illustrates an exemplary result of the application of controlling download rate to the media clip of FIG. 4, based on timing information of the media clip. Media streaming may include two distinct processes: downloading the media data to a mobile device, which happens as fast as the network allows, and playing the media, which happens locally at the encoded media playback rate. If available network bandwidth is insufficient, the media player at the mobile device may stall and rebuffer. On the other hand, if available network bandwidth is much faster than the media playback rate, for example, twice the media rate, by the time half the media is played, the entire media stream may have been downloaded to mobile device 202. If the user chooses to stop the media playback, the remaining downloaded media data would be discarded. This is wasteful of the available bandwidth. The method and system described in this application can control download rate to avoid or minimize such waste, such that if the user chooses to stop the media playback, the remaining bytes that have not yet been played may not have already been downloaded to the mobile device 202.

In the example of FIG. 5, the download rate is reduced to exactly match the real-time of the media stream. The media stream in the media clip is assumed to have a fixed frame rate T. In this case, for instance, the frame with timestamp TS3 is due to be played 3*T seconds after the playback starts at t=0.

The network element implementing download rate control can send, for example, the header and the first frame, as soon as they are received (120) from the media server at t=0. After that, the network element can delay the transmission (130) according to the real-time of the media stream, effectively spreading the transmission of individual frames over time. In this example, the network element can transfer a frame only when the frame's timestamp is due for playback if playback start time is considered to be t=0 (the time the download started). By intelligently controlling the stream transmission rate to the mobile device, the network element can reduce playback interruptions even when bandwidth is limited, maintain only a sufficient buffer, and thus minimizes downloads that would be wasted if the user stops playing the media player.

Figure 6:
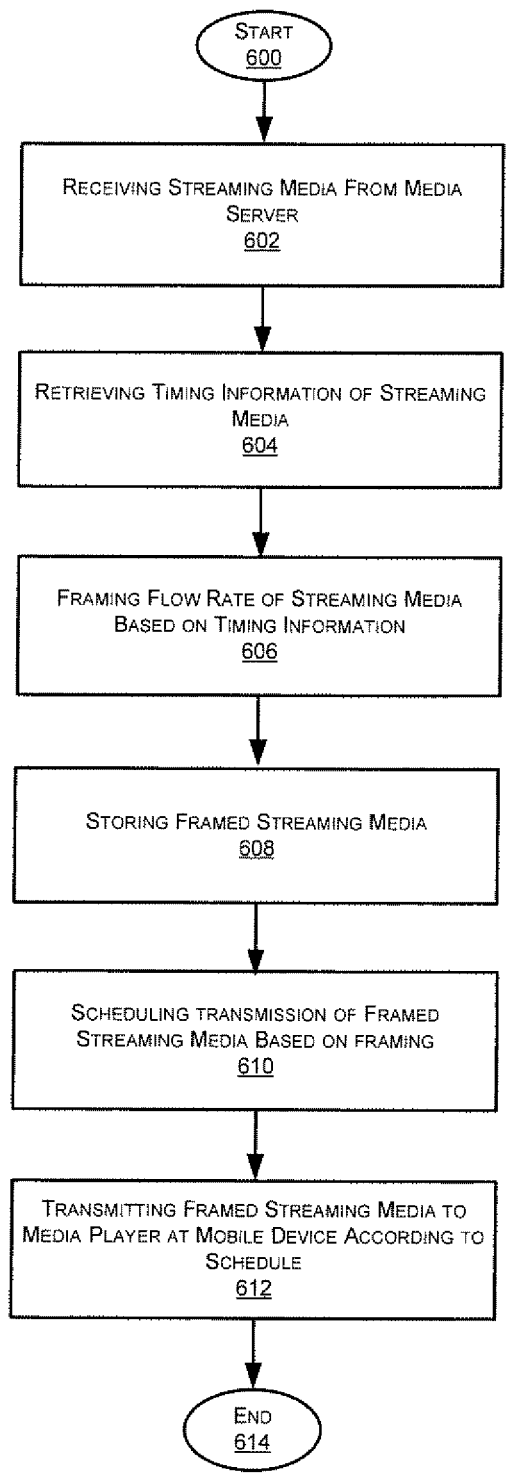
FIG. 6 is a flowchart representing an exemplary method for controlling download rate based on timing information of streaming media.

FIG. 6 is a flowchart representing an exemplary method for controlling download rate based on timing information of streaming media. It will be readily appreciated by one of ordinary skill in the art that the illustrated procedure can be altered to delete steps, change the order of some steps, or further include additional steps. After initial start step 600, a network element receives (602) streaming media from a media server. Then, the network element parses the streaming media and retrieves (604) information of the streaming media. The information can include, among other things, the timing information that corresponds to real-time playback rate of a media player at a mobile device. The network element may transmit to the mobile device a header and the first frame of the streaming media upon receiving them.

After retrieving the timing information of the streaming media, the network element frames (606) flow rate of streaming media based on the timing information, as described above. The network element stores (608) the framed streaming media, and schedules (608) transmission of the framed streaming media according to the framing, such as, among other things, the timing information in the framing.

The network element transmits (612) the framed streaming media to the mobile device for play, according to the schedule. The method then ends (614).

Figure 7A:
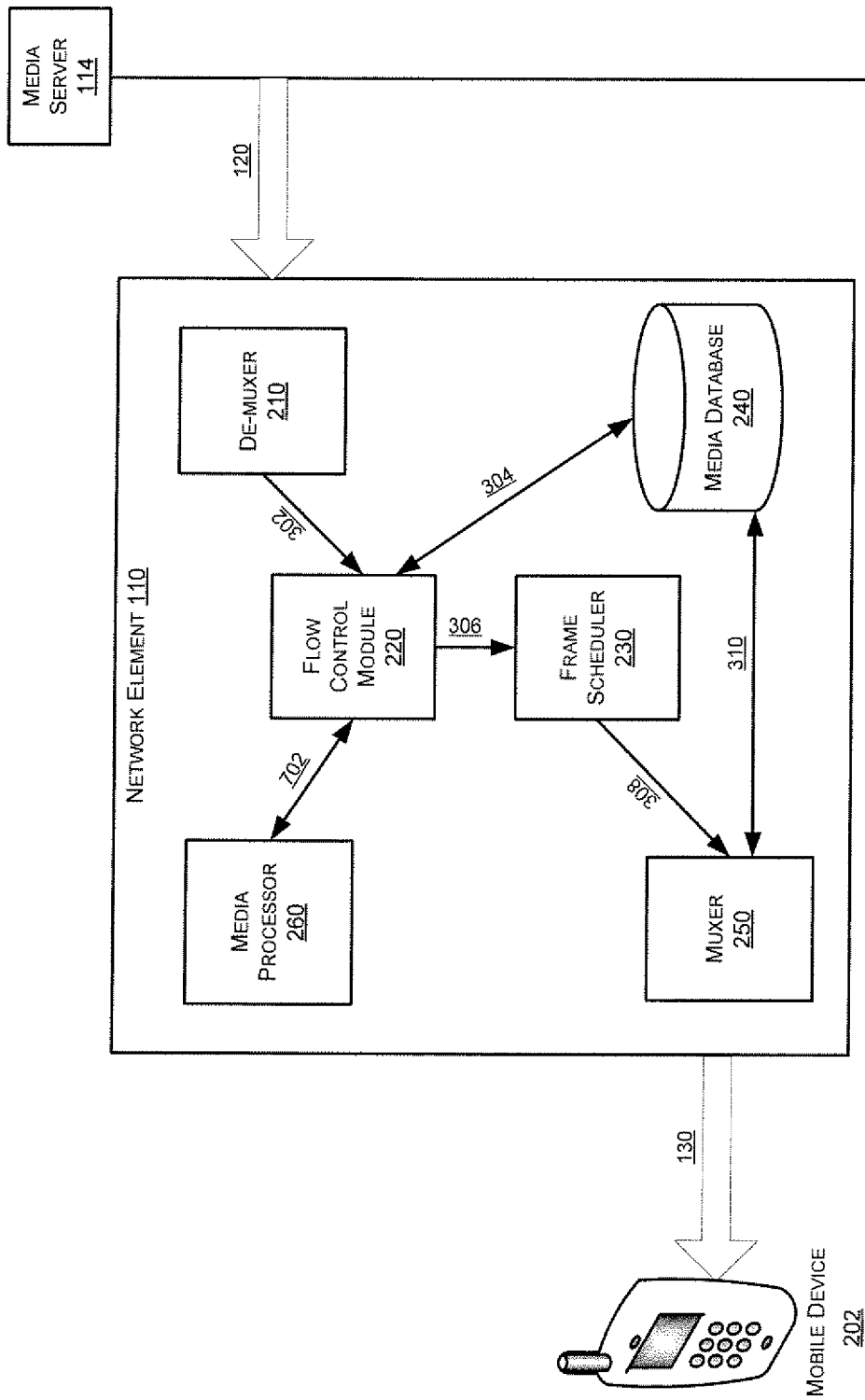
FIG. 7A is a functional diagram illustrating an exemplary communication flow for controlling download rate in the exemplary system of FIG. 2, based on timing information of streaming media and data optimization.

FIG. 7A is a functional diagram illustrating an exemplary communication flow for controlling download rate in the exemplary system of FIG. 2, based on timing information of streaming media and data optimization. The system in FIG. 7A has similar components to those in FIG. 3, except that in FIG. 7A, network element 110 has media processor 260 for combining download rate control with media data optimization.

Besides controlling flow rate of the streaming media based on timing information as described in connection with FIG. 3, network element 110 can further perform data optimization on the streaming media via media processor 260, based on optimization parameters as described below. Media processor 260 can interact (702) with flow control module 220 to combine download rate control with media data optimization. Through data optimization, such as media bitrate reduction techniques, media processor 260 can reduce the size of each media frame. Flow control module 220 then frames flow rate of the reduced-sized streaming media, based on the timing information of the streaming media. This may be beneficial to mobile device 202, which may be located in a network segment with low bandwidth and/or poor quality of service, or which cannot fully utilize the benefits of high quality of the streaming media.

Network element 110 can allow network operators to apply fixed data reduction rates to all or some of their users based on the optimization parameters, such as media source, device used, previous usage profile, time and date, bandwidth, and any other identifying parameters available to the operators. This ability to differentiate among qualities of media service offered to different users can help network operators to control the network abuse that results from excessive media traffic, and thus presents new revenue opportunities for the operators.

Network element 110 can also selectively perform data optimization on streaming media, based on optimization parameters, such as media source. Frequently, media traffic volume may be dominated by just a few web sites. Network element 110 can allow network operators to selectively enable data optimization for such sites while allowing other sites to be viewed unaltered. It also gives the operators the alternative of excluding optimization from certain media download sites whose users may prefer the highest media quality regardless of download time.

The rest of communication flow is similar to the communication flow provided above in FIG. 3.

Figure 7B:
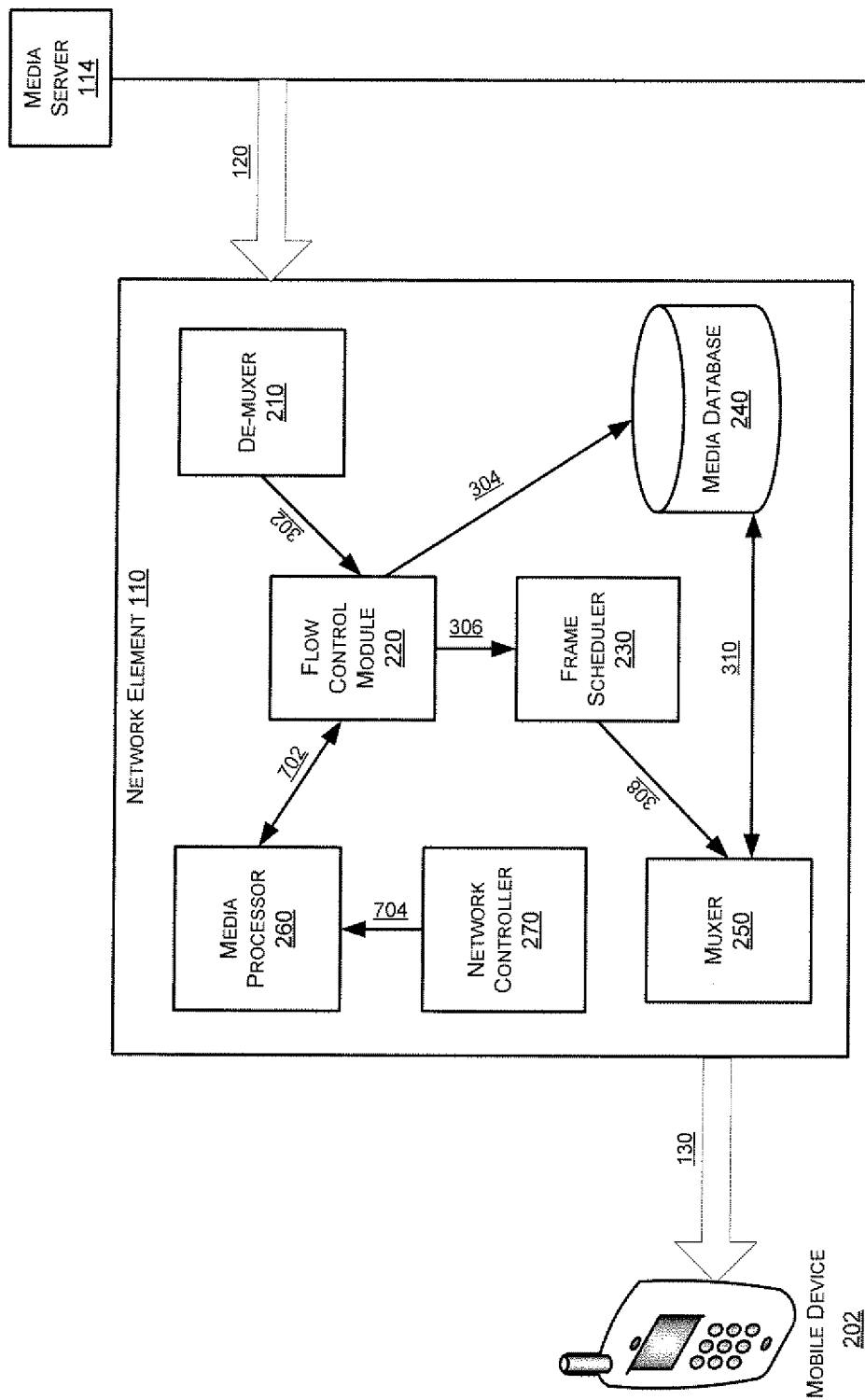
FIG. 7B is a functional diagram illustrating an exemplary communication flow for controlling download rate in the exemplary system of FIG. 2, based on timing information of streaming media and updated information of network.

FIG. 7B is a functional diagram illustrating an exemplary communication flow for controlling download rate in the exemplary system of FIG. 2, based on timing information of streaming media and updated information of network. The system in FIG. 7B has similar components to those in FIG. 7A, except that in FIG. 7B, network element 110 has network controller 270 for detecting changes in the network segment where the mobile device 202 sits.

After having detected changes in the network segment, such as degradation of bandwidth in the network segment, network controller 270 can instruct (704) media processor 260 to perform data optimization on streaming media, as described in FIG. 7A. This can enable dynamic data optimization based on changes in network segment where the mobile device sits, to provide dynamically reduced-sized streaming media. Flow control module 220 can then frame the flow rate of the dynamically reduced-sized streaming media, based on the timing information of the streaming media. This is further illustrated below.

If having detected improvements in the network segment where mobile device 202 sits, network controller 270 can instruct (704) media processor 260 to adjust data optimization on streaming media accordingly. For example, media processor 260 can leave original media bitrate unaltered. Flow control module 220 can then frame flow rate of the dynamically optimized streaming media, based on the timing information of the streaming media.

The rest of communication flow is similar to the communication flow provided above in FIG. 7A.

Figure 8:
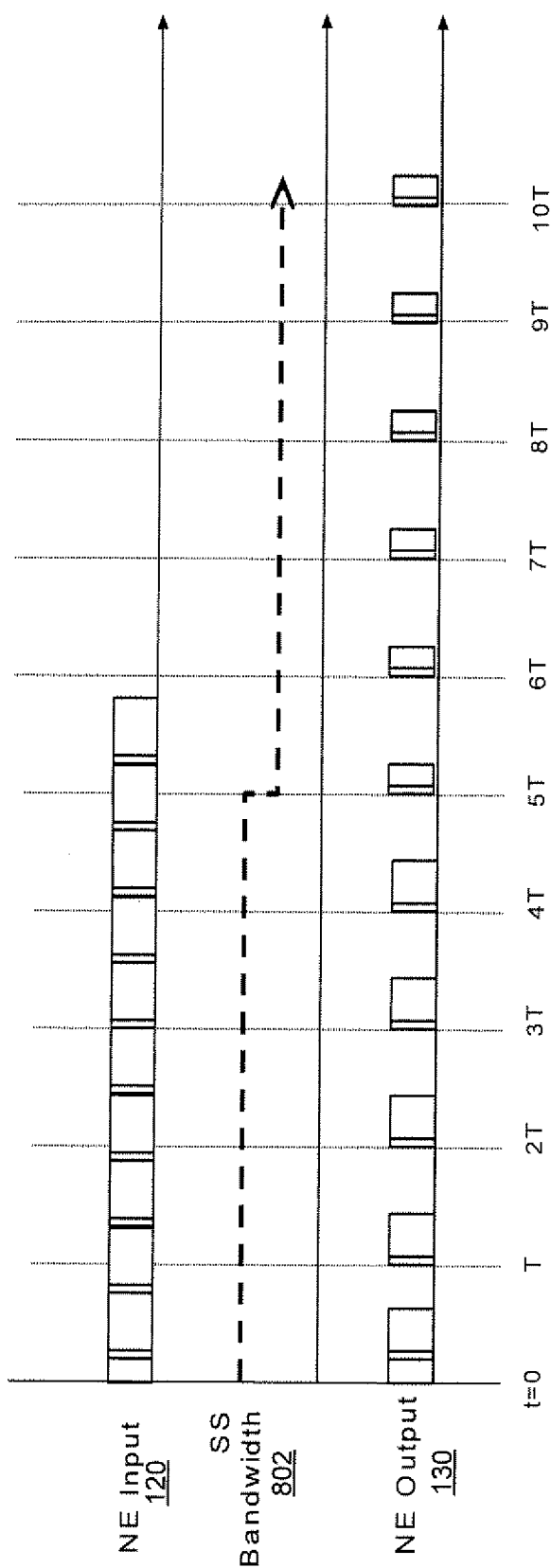
FIG. 8 illustrates an exemplary result of the application of the methods of controlling download rate in FIGS. 7A and 7B to the media clip in FIG. 4.

FIG. 8 illustrates an exemplary result of the application of the methods of controlling download rate in FIGS. 7A and 7B to the media clip in FIG. 4. Processing of the media data to further control the download rate can occur based on this exemplary result.

As illustrated in FIG. 8, the present framework can be combined with more sophisticated traffic reduction techniques which manipulate the media stream 120. One example can be fixed bitrate reduction, where the size of each media frame is reduced. In addition, dynamic bitrate reduction as in Dynamic Bandwidth Shaping can be applied. FIG. 8 illustrates the joint effect of these techniques in the traffic leaving (130) the network element.

In this case as illustrated by FIG. 8, a fixed bitrate reduction operation is performed between 0 and 5 T seconds. The size of the resulting frames is reduced. After 5 T seconds, the bandwidth (802) of the slow segment drops. The network element detects the drop and reduces the bitrate of the stream further, which results in even smaller media frames after 5 T.

Figure 9:
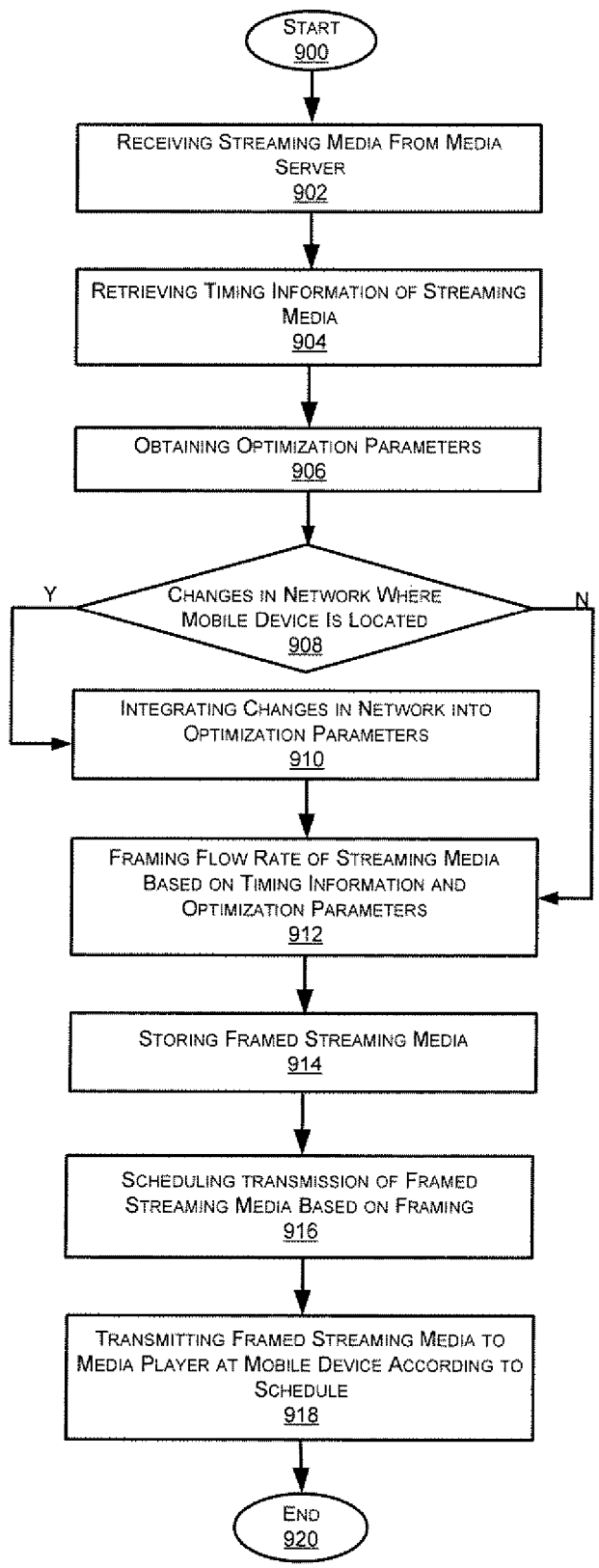
FIG. 9 is a flowchart representing an exemplary method for controlling download rate based on timing information of streaming media, data optimization, and updated information of network.

FIG. 9 is a flowchart representing an exemplary method for controlling download rate based on timing information of streaming media, data optimization, and updated information of the network. It will be readily appreciated by one of ordinary skill in the art that the illustrated procedure can be altered to delete steps, change the order of some steps, or further include additional steps. After initial start step 900, a network element receives (902) streaming media from a media server. Then, the network element parses the streaming media and retrieves (904) information of the streaming media, such as timing information corresponding to real-time playback rate of a media player at a mobile device. The network element may transmits to the mobile device a header and the first frame of the streaming media upon receiving them.

The network element can obtain (906) optimization parameters, which are described above, and detect (908) whether there are changes in the network where the mobile device is located. The changes in network can include, for example, changes in bandwidth of the network segment where the mobile device sits, as described above. If having detected changes in the network, the network element integrates (910) the changes into the optimization parameters.

The network element frames (912) flow rate of streaming media based on the timing information and the optimization parameters. It can apply data optimization to the streaming media based on the optimization parameters, as described above. Then, it frames the optimized streaming media based on the timing information. After that, the network element stores (914) the framed streaming media for transmission, and schedules (916) transmission of the framed streaming media according to the framing, such as, among other things, the timing information in the framing. The network element transmits (918) the framed streaming media to the mobile device for play, according to the schedule. The method then ends (920).

Download Rate Profiles

Figure 10:
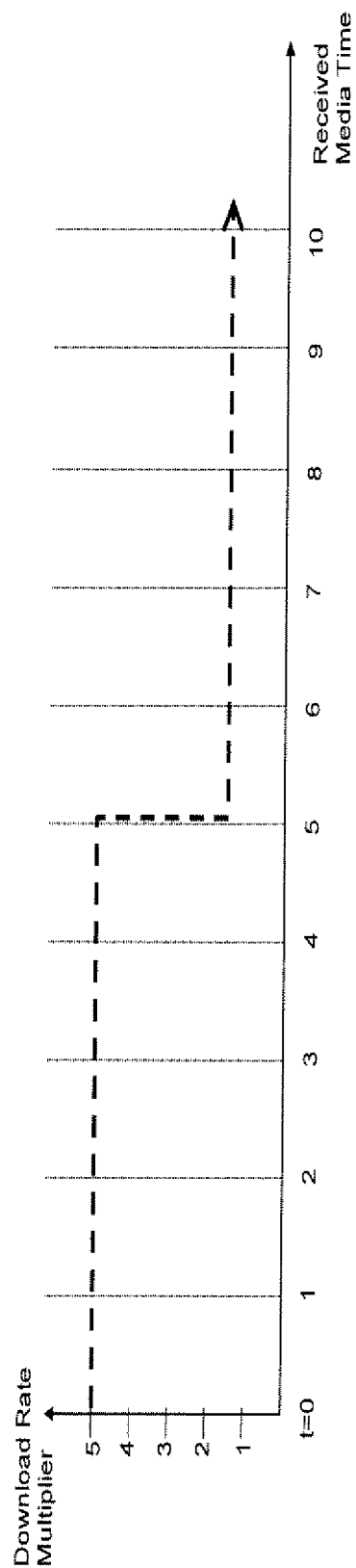
FIG. 10 illustrates an exemplary download rate profile with variable download rate multipliers.

FIG. 10 illustrates an exemplary download rate profile with variable download rate multipliers. Variable download rate multipliers are pre-configured factors that can overcome some undesired effects of real-time downloading.

Ideally, the download rate for a session should be throttled down to comply with the real-time of the session. However, this causes several undesired effects. When a media player at a mobile device initiates the session, it is desirable to transfer enough media stream to allow the playback to start immediately. A high initial download rate is therefore required for a short period of time. After the playing session starts, the download rate can be throttled down to near-realtime to reduce the risk of media player buffer draining. The real time of the session dictates the rate at which the media player may need each portion of the input clip for playback. A rate equal or higher than real-time guarantees that no or minimal wasteful transmission occurs, while ensuring that no playback stalls may occur due to player buffer depletion.

An exemplary download rate profile solving these issues is shown in FIG. 10. In this case, preconfigured variable multipliers to the download rate are applied to control the download rate. For a first time period, for example, for the first 5 seconds, of media time received at the network element, a multiplier, such as a 5× factor, can be used to accelerate the real-time-throttled download, such that the first 5 seconds of the clip can be delayed by only 1 second at the network element. In this example, the playback can only be delayed by the same amount of time, instead of the 5 seconds it would take if the baseline real-time rate was used. For the remaining of the download, for example, a 1.1× factor can be applied. The transmission rate is slightly faster than the baseline rate imposed by real-time, ensuring that the data stored in the player buffer can grow slightly over time, avoiding playback interruptions due to buffer depletion.

Figure 11:
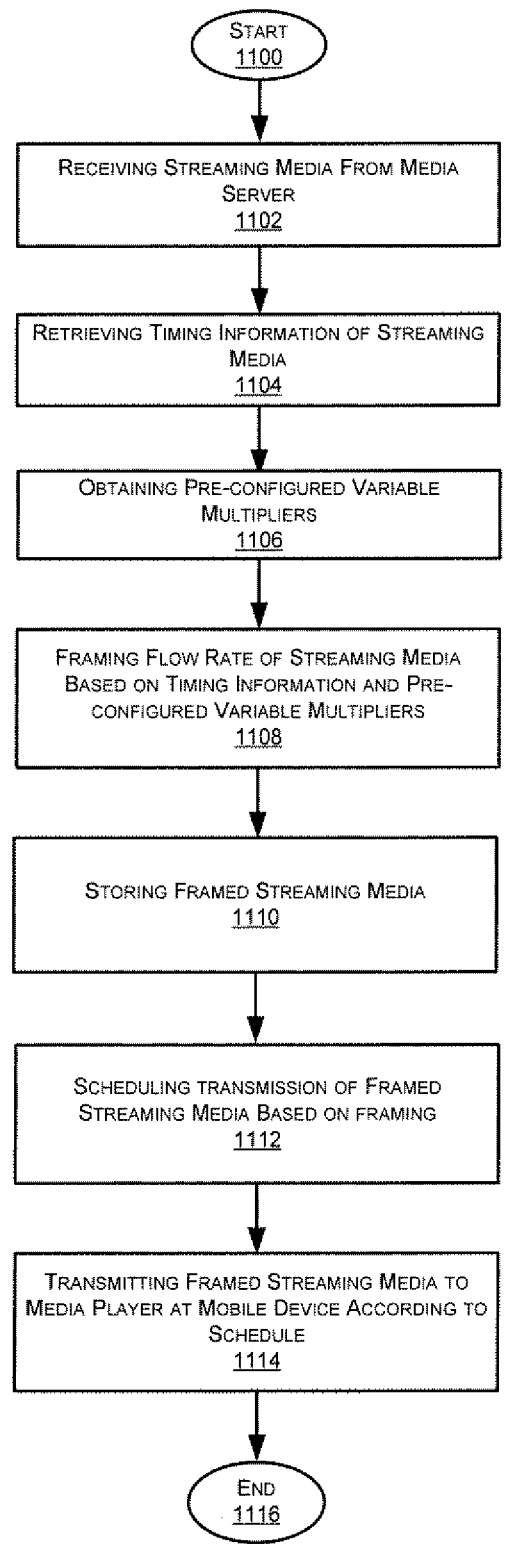
FIG. 11 is a flowchart representing an exemplary method for controlling download rate based on timing information of streaming media and variable download rate multipliers.

FIG. 11 is a flowchart representing an exemplary method for controlling download rate based on timing information of streaming media and variable download rate multipliers. It will be readily appreciated by one of ordinary skill in the art that the illustrated procedure can be altered to delete steps or further include additional steps. After initial start step 1100, a network element receives (1102) streaming media from a media server. Then, the network element parses the streaming media and retrieves (1104) information of the streaming media, such as timing information corresponding to real-time playback rate of a media player at a mobile device. The network element may transmits to the mobile device a header and the first frame of the streaming media upon receiving them.

The network element can obtain (1106) pre-configured variable multipliers, which are described as above. Then, the network element frames (1108) flow rate of streaming media based on the timing information and pre-configured variable multipliers, as described above. After that, the network element stores (1110) the framed streaming media for transmission, and schedules (1112) transmission of the framed streaming media according to the framing, such as, among other things, the timing information in the framing. The network element transmits (1114) the framed streaming media to the mobile device for play, according to the schedule. The method then ends (1116).

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. A computer-implemented method comprising:
   receiving media via progressive download, wherein the progressively downloaded media is requested by a media player at a mobile device, and the progressively downloaded media includes a first portion and a second portion of a plurality of media frames;

retrieving timing information from the progressively downloaded media, wherein the plurality of media frames each carry a timestamp corresponding to a time at which the media frame is played on the media player;

determining a playback rate of the progressively downloaded media on the media player based on the timestamp associated with each media frame of the plurality of media frames;

framing the first portion of media frames based on the determined playback rate;

scheduling transmission of the framed progressively downloaded media based on the framing; and transmitting the framed progressively downloaded media to the media player according to the schedule.

2. The method of claim 1, further comprising:
storing the framed progressively downloaded media; and
providing the stored-framed progressively downloaded media for the transmitting according to the schedule.

3. The method of claim 1, wherein the progressively downloaded media comprises:
a header including information about characteristics of media tracks.

4. The method of claim 3, further comprising transmitting the header to the media player.

5. The method of claim 3, further comprising transmitting the header and the second portion of the media frames to the media player.

6. The method of claim 3, wherein framing the first portion of the media frames comprises framing the parsed progressively downloaded media based on the timestamp of each frame.

7. The method of claim 1, further comprising:
obtaining optimization parameters; and
framing the progressively downloaded media based on the playback rate on the media player and the optimization parameters.

8. The method of claim 7, wherein the optimization parameters comprises:
source of the progressively downloaded media;
characteristics of the mobile device;
previous usage profile of the mobile device;
time and date when the progressively downloaded media is requested by the mobile device; and
bandwidth of network segment where the mobile device is located.

9. The method of claim 8, wherein framing the progressively downloaded media comprises:
optimizing the progressively downloaded media by altering the progressively downloaded media based on one or more of the optimization parameters; and
framing the optimized ptrogressively downloaded media based on the playback rate on the media player.

10. The method of claim 9, wherein optimizing the progressively downloaded media based on one or more of the optimization parameters results in reduction in size of the progressively downloaded media.

11. The method of claim 1, further comprising:
detecting changes in network segment where the mobile device is located;
updating the framing of the first portion of the media frames, based on the playback rate on the media player and the changes in the network segment where the mobile device is located; and
transmitting the updated-framed progressively downloaded media to the media player.

12. The method of claim 11, wherein changes in the network segment where the mobile device is located comprises increases or decreases in bandwidth of the network segment.

13. The method of claim 11, wherein updating the framing of the progressively downloaded media comprises:
optimizing the progressively downloaded media by altering the progressively downloaded media based on the changes in the network segment where the mobile device is located; and
framing the optimized progressively downloaded media based on the playback rate on the media player.

14. The method of claim 1, further comprising:
obtaining pre-configured variable multipliers; and
framing the progressively downloaded media based on the playback rate on the media player and the pre-configured variable multipliers.

15. The method of claim 14, wherein the pre-configured variable multipliers comprise an arbitrary number of multipliers and application period pairs, which can include at least:
a first number factor being used in the framing to control the transmission of the progressively downloaded media to the mobile device during a first time period; and
a second number factor being used in the framing to control the transmission of the progressively downloaded media to the mobile device during a second time period.

16. A system comprising:
a client device having a media player, wherein the client device is capable of requesting progressively downloaded media from a media server; and
an optimization server is configured to:
receive the progressively downloaded media originated from the media server, wherein the progressively downloaded media includes a first portion and a second portion of a plurality of media frames;
retrieve timing information from the progressively downloaded media, wherein the plurality of media frames each carry a timestamp corresponding to a time at which the media frame is played on the media player,
determine a playback rate of the progressively downloaded media on the media player based on the timestamp associated with each media frame of the plurality of media frames,
frame the first portion of media frames based on the determined playback rate,
schedule transmitting the framed progressively downloaded media based on the framing, and
transmit the framed progressively downloaded media to the media player according to the schedule.

17. The system of claim 16, wherein the optimization server is the media server.

18. The system of claim 16, wherein the optimization server comprises:
a de-muxer parsing the progressively downloaded media and retrieving the timing information from the progressively downloaded media;
a flow control module framing the parsed progressively downloaded media and scheduling the transmission of the framed progressively downloaded media, based on the retrieved timing information;
a frame scheduler triggering the transmission of the framed progressively downloaded media according to the schedule specified by the flow control module; and
a muxer transmitting the framed progressively downloaded media to the mobile device.

19. The system of claim 18, wherein the de-muxer parses the progressively downloaded media into:
 a header including information about characteristics of media tracks.

20. The system of claim 19, wherein the flow control module provides the header to the de-muxer for transmitting to the media player.

21. The system of claim 19, wherein the flow control module provides the header and the second portion of the media frames to the de-muxer for transmitting to the media player.

22. The system of claim 19, wherein the flow control module frames the parsed progressively downloaded media and schedules the transmission of the framed first portion of the media frames, based on the timestamp of each frame.

23. The system of claim 18, wherein the optimization server further comprises:
 a storage device storing the framed progressively downloaded media and providing the stored-framed progressively downloaded media to the muxer for the transmitting.

24. The system of claim 18, wherein the optimization server further comprises:
 a media processor optimizing the progressively downloaded media by altering the progressively downloaded media, and providing the optimized progressively downloaded to the flow control module for the framing.

25. The system of claim 24, wherein the optimization server further comprises:
 a network controller detecting changes in network where the mobile device is located, and instructing the media processor to optimize the progressively downloaded media based on the changes.

26. A non-transitory computer readable medium storing instructions that, when executed by a computer, cause the computer to perform a method of framing progressively downloaded media requested by a media player at a mobile device from a media server, the method comprising:
 receiving the progressively downloaded media originated from the media server, wherein the progressively downloaded media includes a first portion and a second portion of a plurality of media frames;
 retrieving timing information from the progressively downloaded media, wherein the plurality of media frames each carry a timestamp corresponding to a time at which the media frame is played on the media player;
 determining a playback rate of the progressively downloaded media on the media player based on the timestamp associated with each media frame of the plurality of media frames;
 framing the first portion of media frames based on the determined playback rate;
 scheduling transmission of the framed progressively downloaded media based on the framing; and
 transmitting the framed progressively downloaded media to the media player according to the schedule.

27. The non-transitory computer readable medium of claim 26, further comprising instructions that, when executed by the computer, cause the computer to perform the method, the method comprising:
 storing the framed progressively downloaded media; and
 providing the stored-framed progressively downloaded media for the transmitting according to the schedule.

28. The non-transitory computer readable medium of claim 26, wherein the streaming media comprises:
 a header including information about characteristics of media tracks.

29. The non-transitory computer readable medium of claim 28, further comprising instructions that, when executed by the computer, cause the computer to perform the method; the method comprising
 transmitting the header to the media player.

30. The non-transitory computer readable medium of claim 28, further comprising instructions that, when executed by the computer, cause the computer to perform the method, the method comprising
 transmitting the header and the second portion of the media frames to the media player.

31. The non-transitory computer readable medium of claim 28, wherein framing the first portion of the media frames comprises framing the parsed progressively downloaded media based on the timestamp of each frame.

32. The non-transitory computer readable medium of claim 26, further comprising instructions that, when executed by the computer, cause the computer to perform the method, the method comprising:
 obtaining optimization parameters; and
 framing the progressively downloaded media based on the playback rate on the media player and the optimization parameters.

33. The non-transitory computer readable medium of claim 32, wherein the optimization parameters comprises:
 source of the streaming media;
 characteristics of the mobile device;
 previous usage profile of the mobile device;
 time and date when the progressively downloaded media is requested by the mobile device; and
 bandwidth of network segment where the mobile device is located.

34. The non-transitory computer readable medium of claim 33, wherein framing the progressively downloaded media comprises:
 optimizing the progressively downloaded media by altering the progressively downloaded media based on one or more of the optimization parameters; and
 framing the optimized progressively downloaded media based on the playback rate on the media player.

35. The non-transitory computer readable medium of claim 34, wherein optimizing the progressively downloaded media based on one or more of the optimization parameters results in reduction in size of the progressively downloaded media.

36. The non-transitory computer readable medium of claim 26, further comprising instructions that, when executed by the computer, cause the computer to perform the method, the method comprising:
 detecting changes in network segment where the mobile device is located;
 updating the framing of the first portion of the media frames, based on the playback rate on the media player and the changes in the network segment where the mobile device is located; and
 transmitting the updated-framed progressively downloaded media to the media player.

37. The non-transitory computer readable medium of claim 36, wherein changes in the network segment where the mobile device is located comprises increases or decreases in bandwidth of the network segment.

38. The non-transitory computer readable medium of claim 36, wherein updating the framing of the progressively downloaded media comprises:
 optimizing the progressively downloaded media by altering the progressively downloaded media based on the changes in the network segment where the mobile device is located; and framing the optimized progressively downloaded media based on the playback rate on the media player.

39. The non-transitory computer readable medium of claim 26, further comprising instructions that, when executed by the computer, cause the computer to perform the method, the method comprising:
obtaining pre-configured variable multipliers; and
framing the progressively downloaded media based on the playback rate on the media player and the pre-configured variable multipliers.

40. The non-transitory computer readable medium of claim 39, wherein the pre-configured variable multipliers comprise an arbitrary number of multipliers and application period pairs, which can include at least:
a first number factor being used in the framing to control the transmission of the progressively downloaded media to the mobile device during a first time period; and
a second number factor being used in the framing to control the transmission of the progressively downloaded media to the mobile device during a second time period.

* * * * *